(12) United States Patent
Aneja et al.

(10) Patent No.: US 10,019,305 B2
(45) Date of Patent: Jul. 10, 2018

(54) INTERNET-BASED DIAGNOSTIC ASSISTANT FOR DEVICE ANALYSIS

(71) Applicant: Robert Bosch GmbH, Stuttgart (DE)

(72) Inventors: Mansimar Aneja, Chennai (IN); Stefan Jungmayr, Ditzingen (DE); Ji Eun Kim, Pittsburgh, PA (US); Tassilo Barth, Merkendorf (DE)

(73) Assignee: Robert Bosch GmbH, Stuttgart (DE)

( * ) Notice: Subject to any disclaimer, the term of this patent is extended or adjusted under 35 U.S.C. 154(b) by 96 days.

(21) Appl. No.: 15/103,098

(22) PCT Filed: Dec. 5, 2014

(86) PCT No.: PCT/EP2014/076695
§ 371 (c)(1),
(2) Date: Jun. 9, 2016

(87) PCT Pub. No.: WO2015/086448
PCT Pub. Date: Jun. 18, 2015

(65) Prior Publication Data
US 2016/0306691 A1    Oct. 20, 2016

Related U.S. Application Data

(60) Provisional application No. 61/914,647, filed on Dec. 11, 2013.

(51) Int. Cl.
*G06F 11/00* (2006.01)
*G06F 11/07* (2006.01)
*G06F 17/30* (2006.01)

(52) U.S. Cl.
CPC ........ *G06F 11/079* (2013.01); *G06F 11/0709* (2013.01); *G06F 11/0748* (2013.01);
(Continued)

(58) Field of Classification Search
CPC .............. G06F 11/079; G06F 11/0793; G06F 11/0748; G06F 11/0709; G06F 11/2257
See application file for complete search history.

(56) References Cited

U.S. PATENT DOCUMENTS

2001/0011260 A1 * 8/2001 Skaanning ......... G05B 23/0281
706/46
2005/0132253 A1 * 6/2005 Gail .................... G06F 11/0709
714/25

(Continued)

FOREIGN PATENT DOCUMENTS

EP    1 236 986 A2    9/2002
JP    H08-30458 A    2/1996
(Continued)

OTHER PUBLICATIONS

International Search Report corresponding to PCT Application No. PCT/EP2014/076695, dated Feb. 11, 2015 (4 pages).

*Primary Examiner* — Charles Ehne
(74) *Attorney, Agent, or Firm* — Maginot, Moore & Beck LLP

(57) ABSTRACT

Methods and systems for a diagnostic service assistant for connected devices. The device service assistant enables users to diagnose and repair connected devices remotely and/or locally with the use of relevant information. The diagnostic service assistant includes a knowledge base with semantic models that manage heterogeneous sources of relevant information distributed over internal and external storage locations, typically accessible through the internet. The heterogeneous sources of information include 1) device profiles, device status, device histories, and/or aggregated information from similar devices from different users, 2) electronic technical manuals and/or 3) user generated contents and 4) aggregated and analyzed knowledge of knowledge sources.

12 Claims, 10 Drawing Sheets

(52) U.S. Cl.
CPC ...... *G06F 11/0751* (2013.01); *G06F 11/0772* (2013.01); *G06F 11/0787* (2013.01); *G06F 11/0793* (2013.01); *G06F 17/30864* (2013.01)

(56) References Cited

U.S. PATENT DOCUMENTS

| | | | |
|---|---|---|---|
| 2008/0294423 A1* | 11/2008 | Castellani | G06F 11/0733 704/4 |
| 2010/0057677 A1 | 3/2010 | Rapp et al. | |
| 2010/0121841 A1 | 5/2010 | He et al. | |
| 2011/0283112 A1* | 11/2011 | Dettinger | G06F 11/0727 713/189 |
| 2014/0024348 A1* | 1/2014 | Hurst | H04M 3/5232 455/414.1 |
| 2014/0025995 A1* | 1/2014 | Narayanan | G06F 11/0706 714/37 |

FOREIGN PATENT DOCUMENTS

| | | |
|---|---|---|
| WO | 2009/077776 A2 | 6/2009 |
| WO | 2010/142977 A1 | 12/2010 |

\* cited by examiner

| Feedback Form | | | | |
|---|---|---|---|---|
| How the Problem has been solved | | | | |
| Description | Causes | Actions | Spare Parts | Feedback |
| Kein Signal vom Speichertemperaturfühler (Warmwasser) vorhanden | Speichertemperaturfühler ist nicht im Schaltfeld des Wärmeerzeugers angeschlossen | Speichertemperaturfühler im Schaltfeld des Wärmeerzeugers anschließen | ->- | ☐ |
| Kein Signal vom Speichertemperaturfühler (Warmwasser) vorhanden | Anschlussstecker FW fehlt im Schaltfeld des Wärmeerzeugers | Anschlussstecker FW im Schaltfeld des Wärmeerzeugers montieren | Anschlussklemme 2 polig grau>>7747026992 | ☐ |
| Kein Signal vom Speichertemperaturfühler (Warmwasser) vorhanden | Speichertemperaturfühler defekt | Speichertemperaturfühler austauschen | Speicher-/ Vorlauffühler RD 9,7 31>>63006631 | ☐ |

| Sparepart Id | Sparepart Description | Sparepart status |
|---|---|---|

Feedback Description

FIG. 11

INTERNET-BASED DIAGNOSTIC ASSISTANT FOR DEVICE ANALYSIS

CLAIM OF PRIORITY

This application is a 35 U.S.C. § 371 National Stage Application of PCT/EP2014/076695, filed Dec. 5, 2014, which claims the benefit of priority to U.S. Provisional Application No. 61/914,647, filed on Dec. 11, 2013, and entitled "Internet-Based Diagnostic Assistant for Device Analysis," the disclosures of which are incorporated herein by reference in their entireties.

FIELD

This disclosure relates generally to the field of diagnosing an operation of a device in the event of a device problem or failure, and more particularly to a method and system for a diagnostic service assistant to troubleshoot device issues with respect to connected devices.

BACKGROUND

Complex electrical or electro-mechanical devices can fail to operate properly on a regular basis. Many of these devices are located in homes or other locations where a user of the device often does not have an adequate level of technical skill to repair the device. In many cases, however, these same users with access to information and/or with the help of a technically skilled person can correct certain failures or restore the device to proper operation. While the primary source of diagnostic instructions is typically the technical manual provided with the device, such manuals can be difficult to understand for some users. In addition, as systems get more complex and inter-connected, for instance heating, ventilation, and air conditioning (HVAC) systems, technically trained individuals, trained service personnel, and even device experts can be confronted with unfamiliar systems.

An internet, with its vast resource of information, introduced another option to correct device issues. As used herein the term "internet" applies to all types of internets including the "Internet" which uses a standard internet protocol suite (TCP/IP) which is accessed through a system of hyperlinks known as the "World Wide Web" or simply the "Web." While the present disclosure describes applications directed to one embodiment using the "Internet" and "World Wide Web", the present disclosure is not limited by these descriptions, and applies to other internets and to other means of accessing such internets.

On the internet, some device users gather in communities to ask questions, provide information, and give support. Such communities can enhance the solution(s) from technical manuals, since technical manuals are often highly structured, provide concise explanations directed to technically proficient individuals, and use a restrictive, unambiguous terminology. These manuals, however, either omit helpful details about symptoms, causes and solutions altogether, or provide only the smallest amount of advice for diagnosing a problem.

More crucially, the symptom descriptions given by non-experts, such as device owners, frequently do not match the accepted language used by technical personnel to describe such symptoms, and do not match standardized error codes found in the manual. Community resources, however, describe symptoms using less technical jargon with a broader more descriptive terminology and can include elaborate explanations of symptoms and solutions. Faults are presented together with their causal backgrounds. In addition, experts often share their knowledge of alternative solutions and time-saving shortcuts when contrasted with the manufacturer's procedures. All in all, community sources can help users understand and evaluate the feasibility of different solutions in the various forms of resources that include texts, images, pictures and videos.

Other sources of information are available for diagnostic services and can be found on the internet if one knows where to look. Examples include service parts catalogs, technical manuals, or the device manufacturer's or device seller's related data such as a list of certified installers. This information is distributed over multiple internet locations and often requires different ways in which to access the information. Unfortunately, all of the resources, whether found in hard copy user manuals, electronic files or copies of other sources of information which are accessible through the internet, do not provide a routinely available and reliable source of device information. In addition, with the introduction of connected devices, devices that are connected to the internet now provide at least some indication of the current working status of the device, which can be useful to those using a community source to diagnose problems.

Initially, internets connected users with existing information. However, as the Internet has evolved, the Internet has become the "Internet of Things" where uniquely identifiable objects, typically devices, and a virtual representation of that object are represented and available on the Internet. Many companies currently provide remote monitoring and control of the accessible devices. Currently, however, the monitoring and control services available through the Internet are limited to the operational phase of the product life-cycle, i.e. after purchase of the product by the user. In addition, all of the possible value added services when customers interact with the connected devices over an entire product life-cycle, from design to product introduction and thereafter, are not being fully utilized. One common problem encountered by a user across the different domains is the lack of immediate help when their device encounters a problem.

Organized and comprehensive diagnostic solutions for complex devices are not provided as web-based applications that can be accessible from anywhere where internet access is available. Also, the knowledge is scattered in various sites that are often managed by different people in an organization, or the knowledge is only available from and being externally managed by a company different than the manufacturer of the device. Consequently, what is needed is an internet based location in which a community of stakeholders having an interest in one or more devices can access information related to the operation and maintenance of a device.

SUMMARY

The present disclosure includes a semantic knowledge base to provide access to different sources of information via a single interface and/or unified interfaces. While different sources of information, even while being internet accessible, are often isolated and disconnected from one another, the present disclosure enables access to disparate sources of information. The ontology, or relationships between information, in an internet or web based system of the present disclosure, provides a capability to determine the extent of a device's problems. Diagnostic solutions with relationships between similar instructions, causes and other entities is obtained from the multiple sources of information which were previously only accessible or understood by a trained technician having years of experience.

The Web-oriented architecture of the present disclosure enables users to access the diagnostic services from anywhere where internet access is available.

The connected devices are remotely accessible by the users which enable the users to diagnose the status of a device. The diagnostic services are employed by the users who interact with both the physical devices connected to the internet and with the diagnostic services when subcomponents/parts are adjusted, modified or replaced. The diagnostic service assistant provides to the user the most relevant information by determining device information such as model number, peripherals or parts, current faults that are obtained from the connected device, all of the provided maintenance history, current steps and context in the diagnostic process.

Information presented to the user is derived from an analysis of semantic models that integrate heterogeneous knowledge information distributed and stored on an internal database and server, as well as external knowledge available on an internet or the web. The semantic knowledge is derived by identifying a device's inherent functions and parts content by its type or meaning.

A diagnostic service component, in one embodiment, predicts future faults by analyzing device behaviors and prevents the predicted failure by notifying the user to take preventive actions. The diagnostic service component incorporates expandable features to support advanced diagnostic services which are added by analyzing additional data that becomes available over time from similar devices and user profiles.

Users participate in the diagnostic services through the different channels of information provided by a platform to share and help each other.

Methods and systems described herein provide a uniform access to the heterogeneous sources of information via a single, unified interface. The methods and systems also provide the most relevant and up-to-date information for the users who have a problem with their connected devices.

A method for providing diagnostic services for a device has been developed. The method comprises: generating an ontology with a server, the ontology including: a diagnostic model having a plurality of diagnostic concepts at least including faults, symptoms, causes, and solutions, and defining relationships between each of the diagnostic concepts; and a plurality of diagnostic data relating to a device model corresponding to the device, each diagnostic datum being associated with at least one of the diagnostic concepts; storing the ontology in a memory, the memory being accessible by the server; receiving a diagnostic query from a user of the device via an input device, the input device being operatively connected to a user interface, the user interface being connected to the server via a network; identifying at least one diagnostic concept that is associated with the diagnostic query by searching the ontology with the server; and outputting the identified at least one diagnostic concept and diagnostic data associated with the identified at least one diagnostic concept to the user.

A system for providing diagnostic services for a device has been developed. The system comprises: a memory configured to store an ontology, the ontology comprising: a diagnostic model having a plurality of diagnostic concepts at least including faults, symptoms, causes, and solutions, and defining relationships between each of the diagnostic concepts; and a plurality of diagnostic data relating to a device model corresponding to the device, each diagnostic datum being associated with at least one of the diagnostic concepts; and a server operatively connected to the memory, the server being configured to: receive a diagnostic query from a user of the device via an input device, the input device being operatively connected to a user interface, the user interface being connected to the server via a network; identify at least one diagnostic concept that is associated with the diagnostic query by searching the ontology with the server; and output the identified at least one diagnostic concept and diagnostic data associated with the identified at least one diagnostic concept to the user.

This present disclosure enables users to obtain substantially immediate help from online services and communities to manage diagnostic services efficiently. Also feedback and actions taken to resolve issues by the users during the process of the diagnostic services, improves the system's capabilities of providing solutions by learning and adaptation.

BRIEF DESCRIPTION OF THE DRAWINGS

FIG. 11 illustrates a user interface displaying a feedback form for a specific diagnostic and repair occurrence.

DESCRIPTION

For the purposes of promoting an understanding of the principles of the embodiments disclosed herein, reference is now made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

Figure 1:
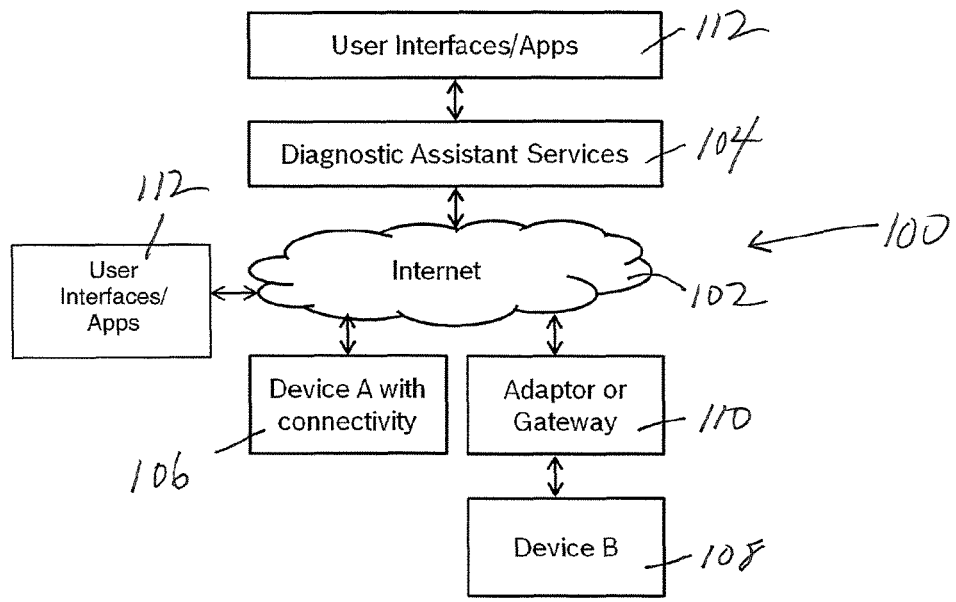
FIG. 1 illustrates a diagnostics services system configured to enable a user to monitor and diagnose a status of a device connected to an internet.

FIG. 1 illustrates a block diagram of diagnostics services system 100 configured to enable a user to monitor and diagnose a status of one or more devices connected to an internet 102. The services system 100 includes a diagnostic assistant services component 104 coupled to the internet 102 through a network (not shown) which in different embodiments includes any number of different types of networks including one or more wide area network(s), intranets(s) or any other of distributed networks, such as a local area network, a satellite communication network, a public network, or a metropolitan area network. Transmission of information from the services component 104 to the internet 102, in one or more embodiments, includes a wired or wireless link or any other known or later developed element that is capable of supplying electronic data to and from the connected elements. A device "A" 106 having included connectivity is coupled to the internet 102. A device "B" 108, lacking included connectivity, is coupled to an adaptor or gateway 110 that provides one or more communication stacks enabling coupling of the device to the internet 102. The services component 104 communicates with the devices 106 and 108 that are connected to the internet.

The services component 104, in different embodiments, is stored on a server which is located at a device manufacturer, a device installer, a contractor, or on other servers that are located on or accessible through the internet 102. Device status is updated to the services component 104 through the internet 102 and/or the updated device status is stored as device history in an internal data storage location or memory present in the services component 104. Data storage, however, in other embodiments, is located anywhere the data is accessible by a system user. In another embodiment, the device status is obtained directly from the device. Consequently, device status may be determined from the device itself or from other data storage or memory locations external to the device.

The services component is accessible from any location by using a user interface 112 that includes internet connectivity such as smart phones, tablets, personal computers (PC), services and applications (Apps). Access to the services component 104, is provided through the interface 112, as is generally understood by those skilled in the art. The user interface/applications 112, in different embodiments, is connected directly to the internet 102, through the internet 102, and to the diagnostic assistant services 104 or directly to the diagnostics assistant services 104.

Figure 2:
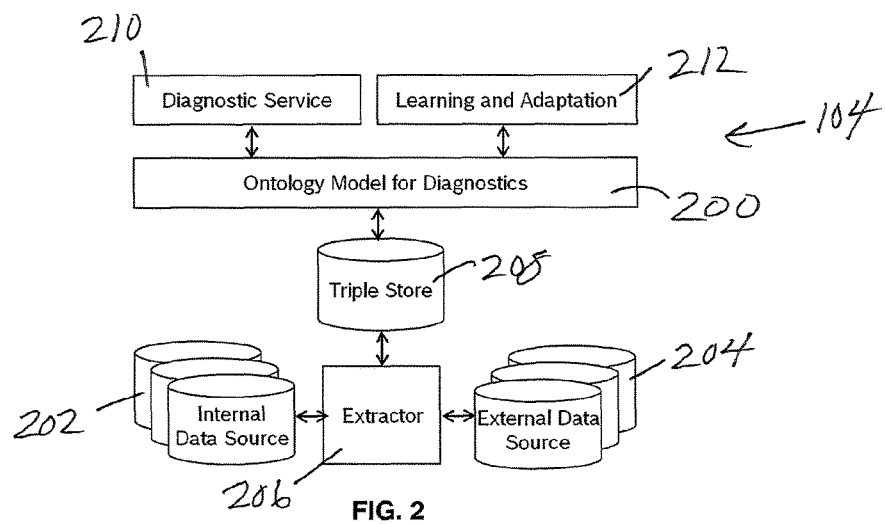
FIG. 2 is a schematic block diagram of diagnostic assistant services component of the diagnostics services system of FIG. 1.

FIG. 2 is a schematic block diagram of the diagnostic assistant services component 104 of the diagnostics services system 100 of FIG. 1. The services component 104 includes an ontology model for diagnostics component 200 which includes a plurality of ontology models. In this context, an ontology model is an explicit specification of a conceptualized model of a device that is typically directed to functions and features of the device. Each of the ontology models is directed to a single product which includes taxonomy of the product information including types, model names and a taxonomy of the manufacturer's information such as brand names, subcomponents and spare parts information. Many different types of products are included in the diagnostics component 200, each of which includes similar types of product information. The diagnostics component also includes a diagnostics ontology model having a taxonomy that represents symptoms, faults, causes and solutions for each of the types of products represented. These ontology models are either manually defined by a domain expert, a knowledge engineer, or automatically derived by software from information provided by users of the system.

Companies, including manufacturers and service providers, have multiple sources of information which is available internally. These sources of internal data include service parts catalogs, technical manuals, or human resource related data for use by customers such as the list of certified installers. This internal data is identified as an internal data source component 202 in FIG. 2. While illustrated as being compiled as a single data source, the internal data of the services component 104 need not be physically located at a single location. In addition to the internal data sources, external data sources, indicated as an external data source 204 in FIG. 2, includes information relevant to the products and diagnostic services. Examples of external data sources include user generated data in the stakeholder community related to the domains of the products, and social media data including videos, texts and images available on the internet. These external data sources are used for other software services. The external data sources are identified, stored and catalogued in different formats of data, including structured data such as SQL (structured query language) database, or unstructured data such as files, or semi-structured data such as HTML (hypertext markup language).

The services component 204 also includes an extractor component 206, which is operatively coupled to the internal and the external data source components 202 and 204. The extractor component 206 includes one or more software packages configured to extract the relevant information from internal and external data sources and to load the extracted knowledge to a triple store component 208. The triple store component 208 is configured to take the extracted information provided by the extractor component 206 and to organize the information according to conceptual descriptions or to model extracted information according to product types, faults, symptoms, and solutions. The triple data is a data entity that is based on a subject-predicate-object configuration.

The triple store component 208 includes software components configured to organize the extracted data according to ontology model representations which in different embodiments include RDF (Resource Description Framework) and OWL (Web Ontology Language) standardized by the World Wide Web Consortium (W3C). The extractor 206 runs periodically to extract new knowledge from the internal data sources and the external data sources through the respective components 202 and 204.

The services component 104 further includes a diagnostic service module 210 which includes one or more software packages configured to provide diagnostic related services including a remote device status check and/or a guided repair guide with step-by-step instructions. Examples of functionalities in diagnostic service module 210 include, in different embodiments, the following questions:

1) Given a symptom S, what are possible causes for S and solutions to eliminate S?
2) Given a component C, what are solutions and symptoms concerned with component C?
3) Given a product P, what are faults, causes and symptoms occurring with product P?
4) Given a solution SO, what are the steps necessary to implement the solution SO?
5) Given a maintenance history (sequence of maintenance steps), what is the next maintenance step to be carried out in a solution procedure?

A learning and adaptation component 212 is operatively coupled to the diagnostics component 200. The learning and adaptation component 212 adapts the information present on the knowledge base which is available in the triple store component 208. This adapted information is updated over time to continuously reflect changes to the information. The adapted information is based on an analysis of the information in the knowledge base with any state-of-the-art methods for statistical analysis, machine learning and data mining.

Figure 3:
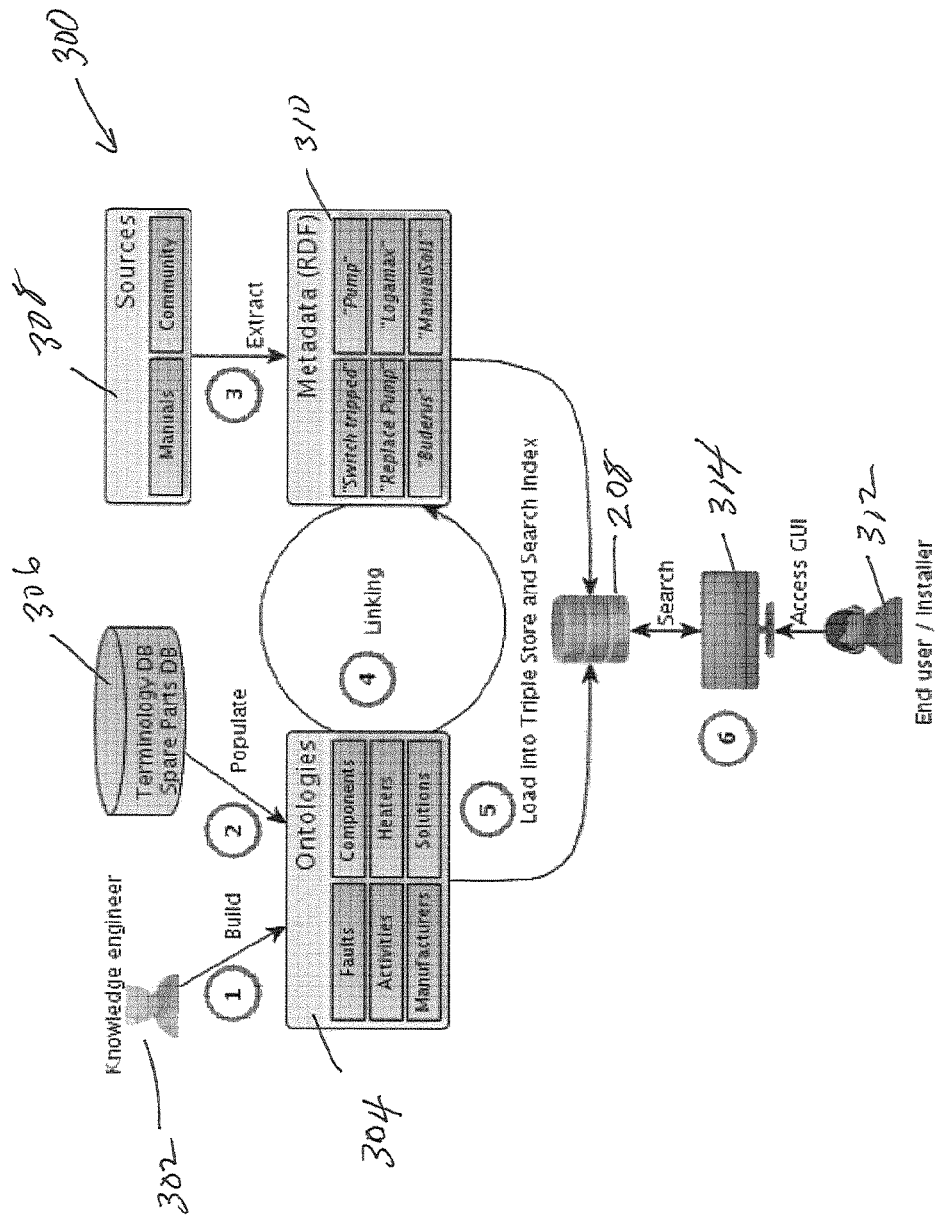
FIG. 3 is a schematic block diagram of a process to make the diagnostics services system of FIG. 1.

FIG. 3 illustrates one embodiment of a procedure 300 to construct the diagnostics services system 100. The procedure 300 includes the following steps 1 through 6 which correspond to the numbers found in FIG. 3.

1. Domain experts, including a knowledge engineer 302, devise a model of the diagnosis process for a selected domain related to a particular device as well as a taxonomy of the selected device and the device's subcomponents. The results in this step are necessary ontology models component 304 such as a diagnostic ontology model and a product ontology model.
2. Information such as service parts information is populated to a semantic knowledge database, which is present in the ontology models. The semantic knowledge database is derived from a terminology/spare parts database 306.
3. The extractor software programs are developed to extract information from device manuals, community solutions and other knowledge sources 308. The extracted information is catalogued and identified by the knowledge engineer 302 using metadata, the information and related metadata identifiers being stored in a database 310. In the described embodiment, the RDF framework is used as the metadata model.
4. The extracted knowledge is tagged with ontology concepts which are defined in the ontologies model component 304. Based on the relations defined in the ontologies, additional relations are inferred.
5. The expanded RDF data is loaded into the triple store 208 of FIG. 2. Additionally, an index over textual facts ensures rapid search access.
6. User interface software is developed, and is available to an end user 312 through a graphical user interface 314. The end user 312 includes owners and one or more installers who have access to the described ontologies and databases to configure the information if necessary.

Figure 4:
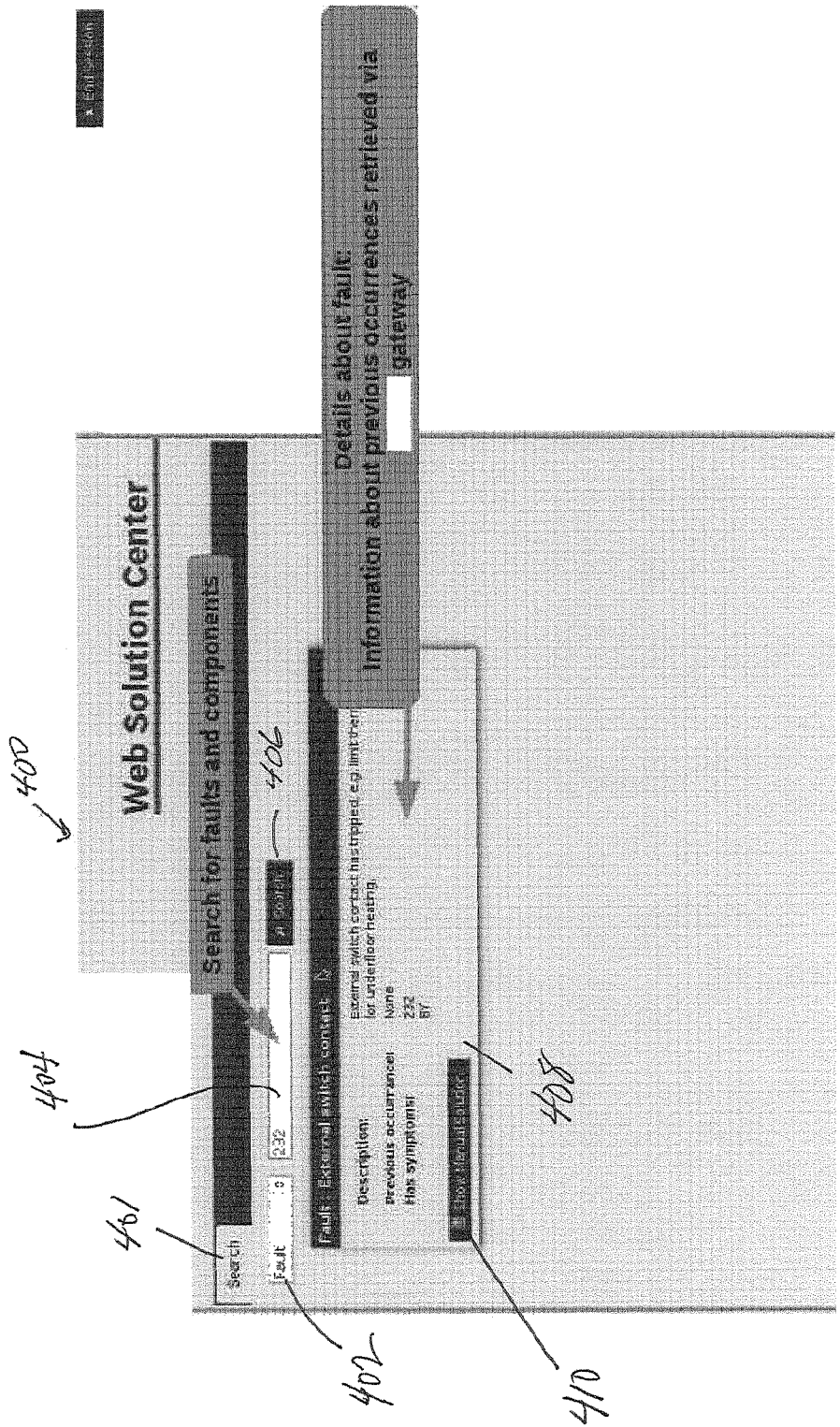
FIG. 4 illustrates a user interface displaying details of a fault condition.

FIGS. 4-9 illustrate a plurality of user interface screens which are available to a user/stakeholder through the user interface/apps 112 of FIG. 1. FIG. 4 illustrates a user interface 400 displaying details of a fault condition which is generated in response to a search made by the user. The illustrated user interface includes a search tab 401. In the search tab, a user can enter semantic queries by typing text into a search box, or selecting options from pull-down menus. In the illustrated interface screen, a user selects from a number of available search topics available at a pull-down menu 402. As illustrated, the user selects "Fault" so that information related to faults, or symptoms of the fault, is retrieved from the diagnostic assistant services component 104. Other search topics available at the pull-down menu include product type, components, and user manuals. In this example, the user has selected fault number 232 which is entered into a field box 404. The entry is either be made by typing in the numbers "232" or is be located through a pull down menu available through the field box 404. Once a search button 406 is selected, the system provides an output field 408 of the fault 232. The output field 408 in this embodiment provides an identification of the fault as being an external switch contact, with a more detailed description of the fault, the number of previous occurrences, and the symptom number 232. The user interface screen 400 further includes a "Show Manual Solution" button 410 which the user selects if the retrieved fault appears to apply to the symptom experienced by the user.

Figure 5:
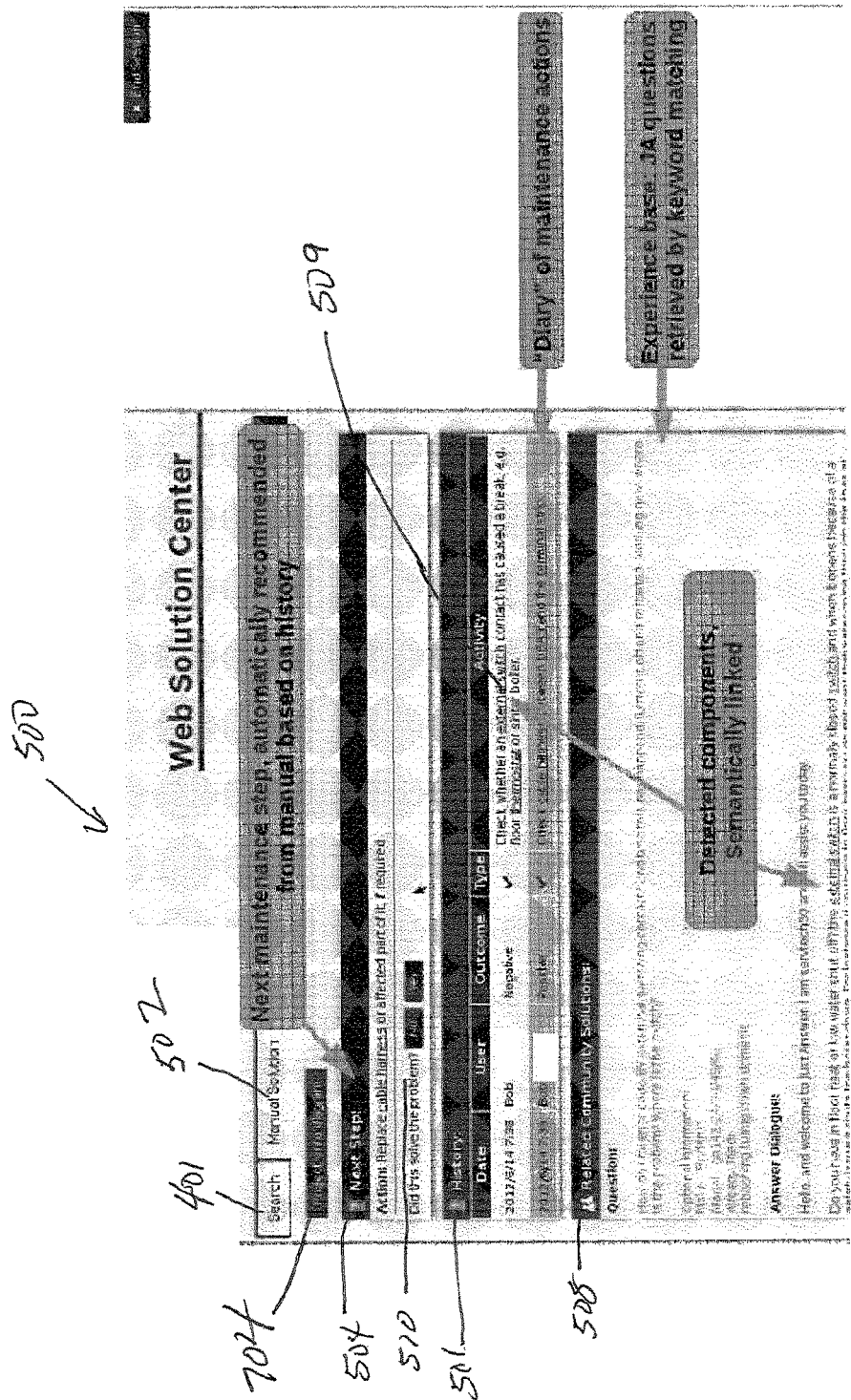
FIG. 5 illustrates a user interface displaying a recommended maintenance step.

FIG. 5 illustrates a user interface displaying a recommended maintenance step if the user selects the button 410 of FIG. 4. If selected, a next step user interface screen 504 is displayed on the user interface 112. The screen 500 is displayed under a manual solution tab 502 located next to the search tab 401. The manual solution tab 502 includes information related to "Next Step" at field 504, "History" at field 506, and "Related Community Solutions" at field 508. The field 504 describes an action to be taken that includes one or more buttons 510 to be selected by the user to indicate whether the problem has been solved. The field 506 describes the history of prior attempts to fix the problem and includes a date, a user, an outcome, a type, and an activity taken to fix the problem. The text in any one of these fields, in different embodiments, includes hyperlink text which is useful to a user. For example, any component of interest in a solution is displayed as hyperlink text. Such a component of interest may include a part that is to be replaced by a spare part. The field 508 includes related community solutions including questions asked, identification date such at time, date, and questioner identity, and conversation occurring between the user and an individual discussing solutions to the problem with the user. Each of the fields, in one embodiment, includes hyperlink text to semantically link detected components.

Figure 6:
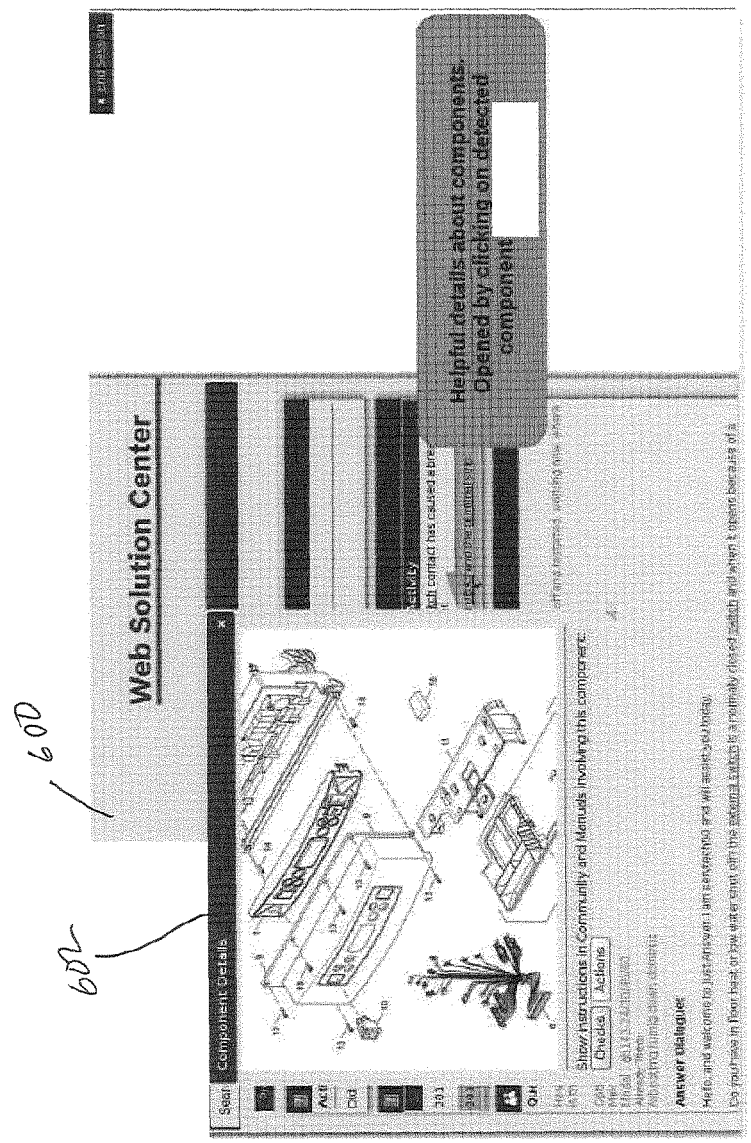
FIG. 6 illustrates a user interface displaying component parts of a device.

FIG. 6 illustrates a user interface 600 displaying component parts of a device. The component parts of the device are illustrated in response to a user selecting the hyperlink text "external switch" hyperlink 509 of FIG. 5. Upon selection of the hyperlink text "external switch", the user interface 600 displays a drawing of the "external switch" and additional component parts to illustrate the environment in which the "external switch" is located. Additionally, the displayed parts indicate alternative solutions to the fault condition. In some embodiments, the component details window 602 can be used enable the user to select a component that he or she believes is in need of repair or is otherwise related to the diagnosis of a fault of the device. Each of the displayed components is interactive with the user, that is, the user selects a component of interest to obtain additional information about the selected component, such as common faults, symptoms, and causes related to the component. In another embodiment, "hovering" over a selected component also displays details. As seen in the user interface 600, the component drawing is available at a component details window 602.

Figure 7:
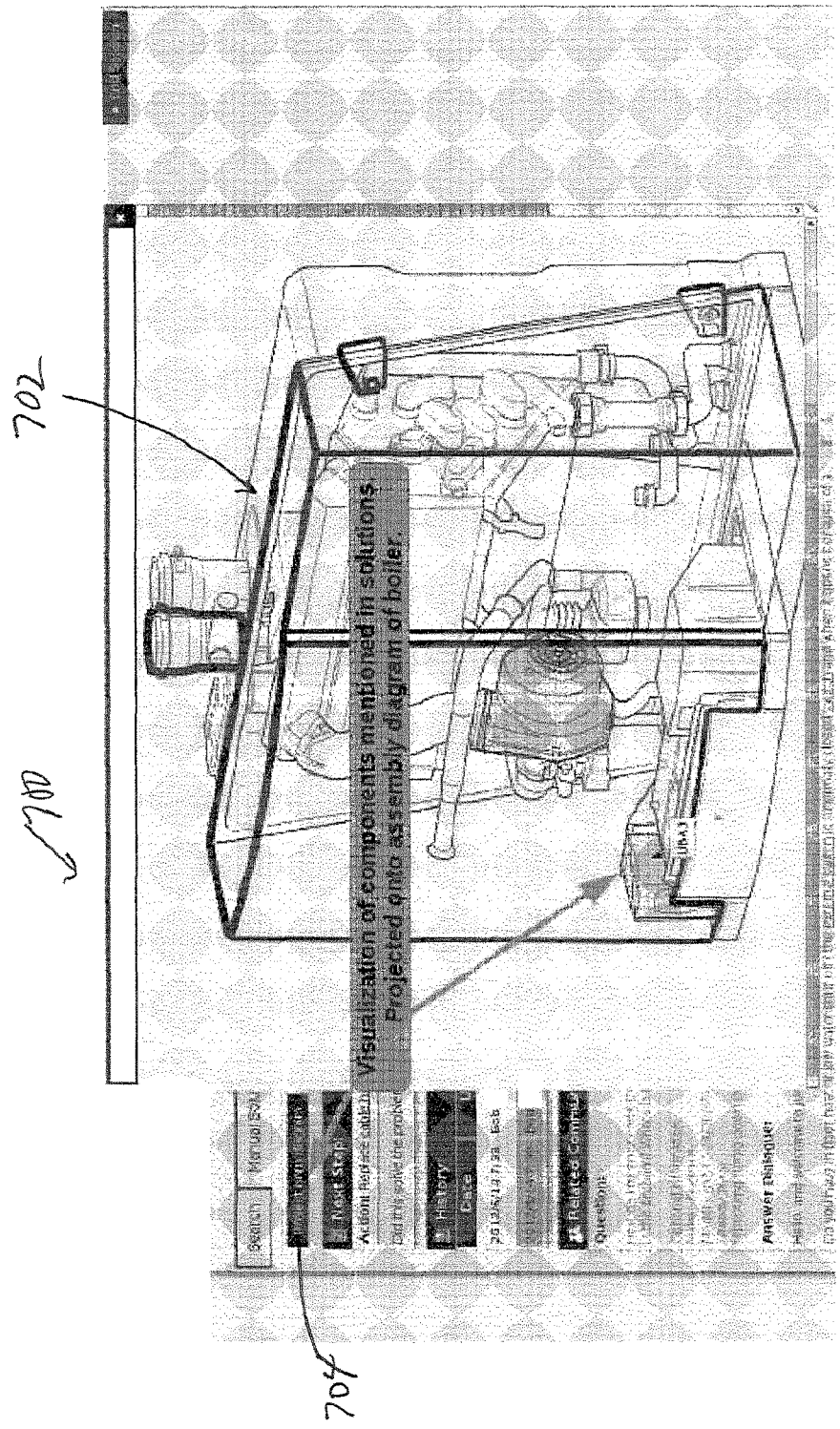
FIG. 7 illustrates a user interface displaying a location of a component identified in a solution to a device problem.

FIG. 7 illustrates a pop-up window 700 displaying a location of a component identified in procedure for implementing a solution to a device problem. When a component of interest is selected in the user interface 600, the selected component can be displayed in the pop-up window 700 as a component of a larger assembly by selecting button 704 An assembly diagram 702, for instance, is displayed and the location of the selected component is shown within the assembly. A "project onto diagram" button 704 (see also FIG. 5) is selected to project or highlight the selected component in the diagram.

Figure 8:
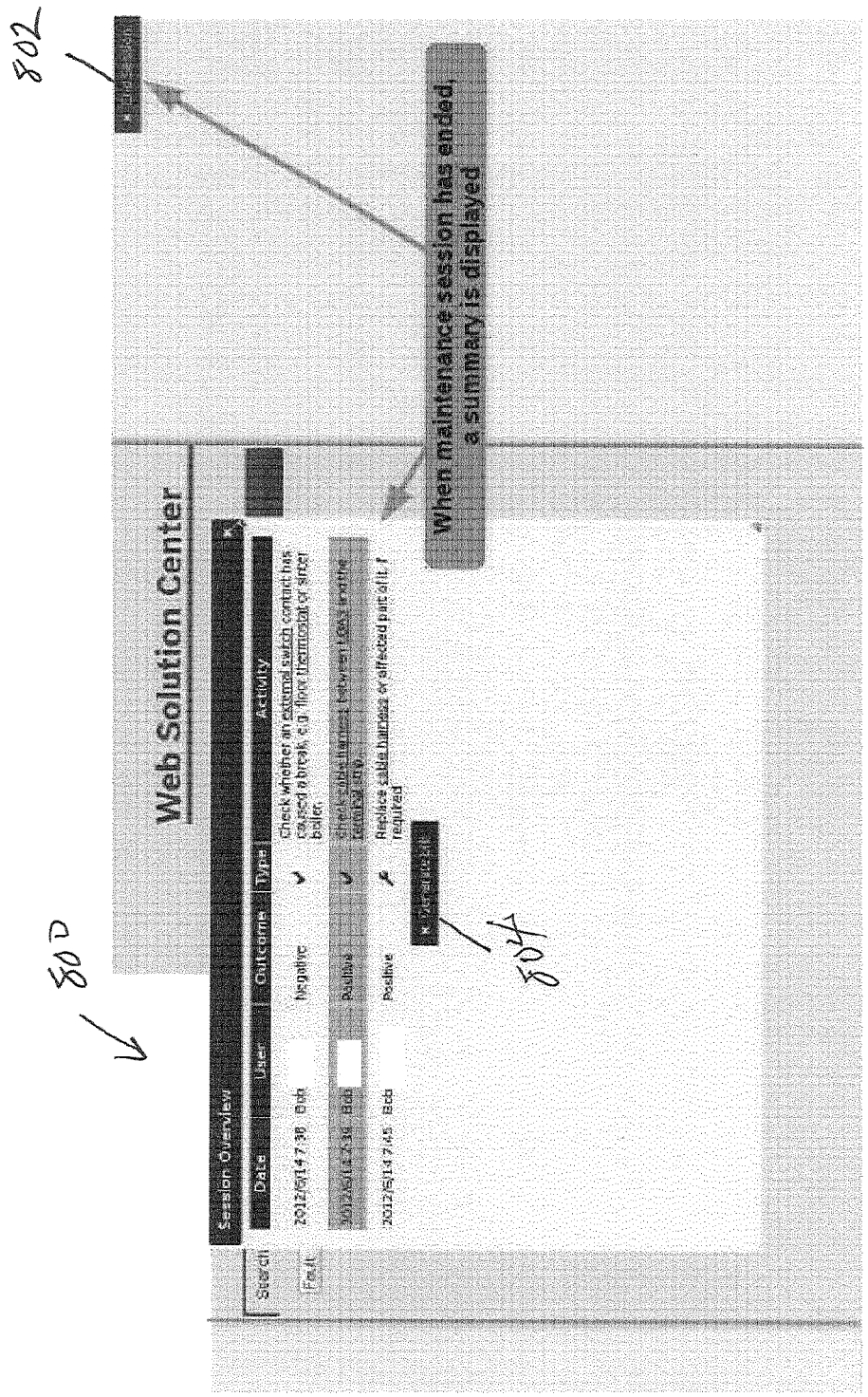
FIG. 8 illustrates a user interface displaying a summary chart of a diagnostic session.

FIG. 8 illustrates a session overview window 800 displaying a summary chart of a diagnostic session. An end session button 802 is selected to display the summary chart as a session overview. In addition to a summary of the current diagnostic session being displayed, prior diagnostic sessions are also displayed. A generate bill button 804 is included to generate an invoice.

Figure 9:
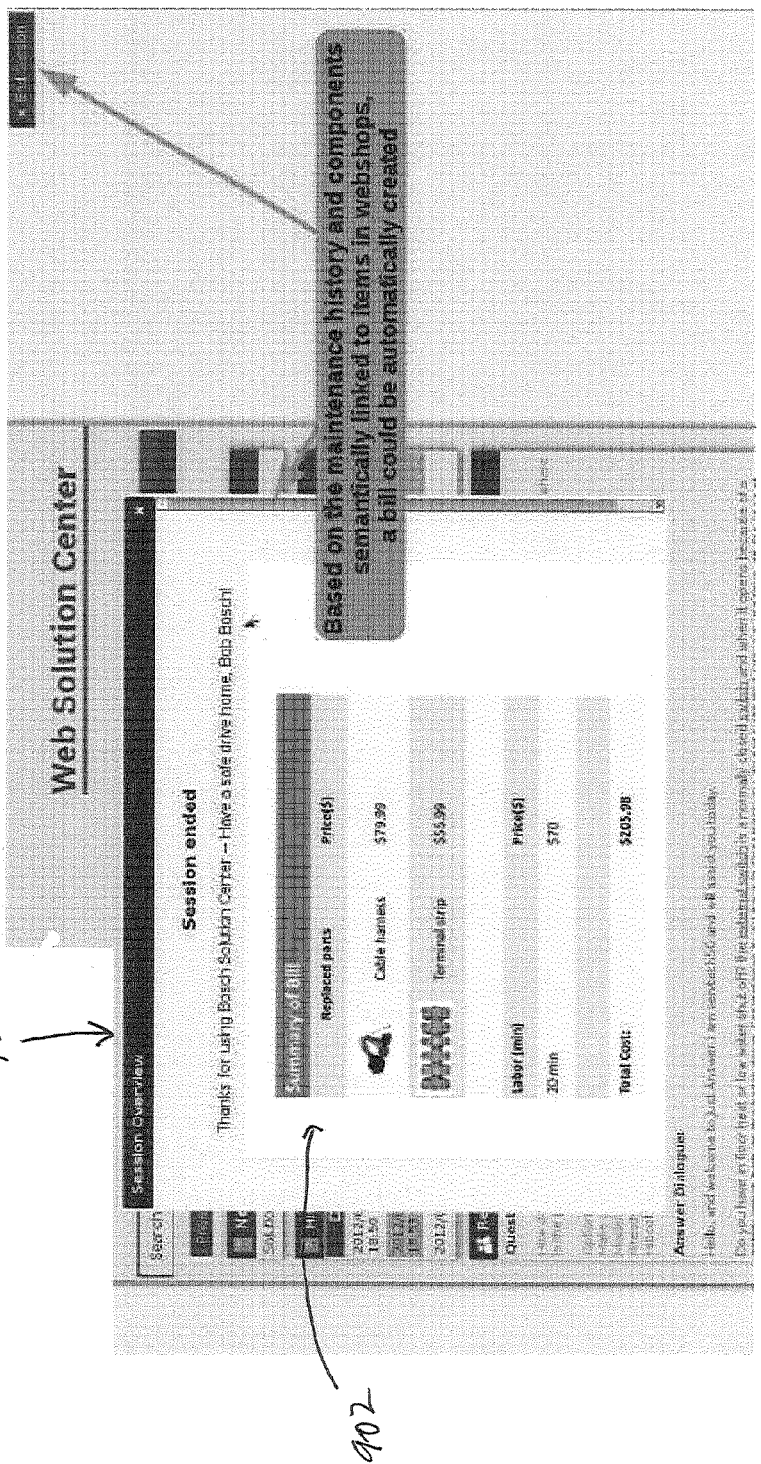
FIG. 9 illustrates a user interface displaying an invoice for parts and labor needed to solve a device malfunction.

FIG. 9 illustrates a detailed session overview window 900 displaying an invoice 902 for parts and labor needed and/or used to solve a device malfunction generated in response to selection of the generate bill button 804 of FIG. 8. The generated invoice includes items which would be used in the device to fix the problem as well as a labor charge. A total cost is also displayed. The invoice 902, in one embodiment, is an actual invoice generated by an installer who has performed or will perform the work necessary to correct the device malfunction. The invoice 902 is provided to a user as either an estimate or a final bill of parts and services. In another embodiment, the invoice 902 is generated by and for the end user as either an estimate of or an actual cost of parts and services. Information on the invoice also provides an indication to the end user of cost so that the end user can decide whether to fix the malfunction on his/her own. In another embodiment, the labor entry is linked to a particular installer or service provider and indicates service fees charged by that particular entity. While the invoice 902 is illustrated as a window which opens on the web solutions center screen, other configurations of user interfaces are possible. The window may include a print button or a save button for recording the invoice. The invoice 902, in another embodiment, opens as a portable document format (pdf) document which is storable and/or printable. Other user interfaces are within the scope of the present disclosure which provides a summary of the bill.

Figure 10:
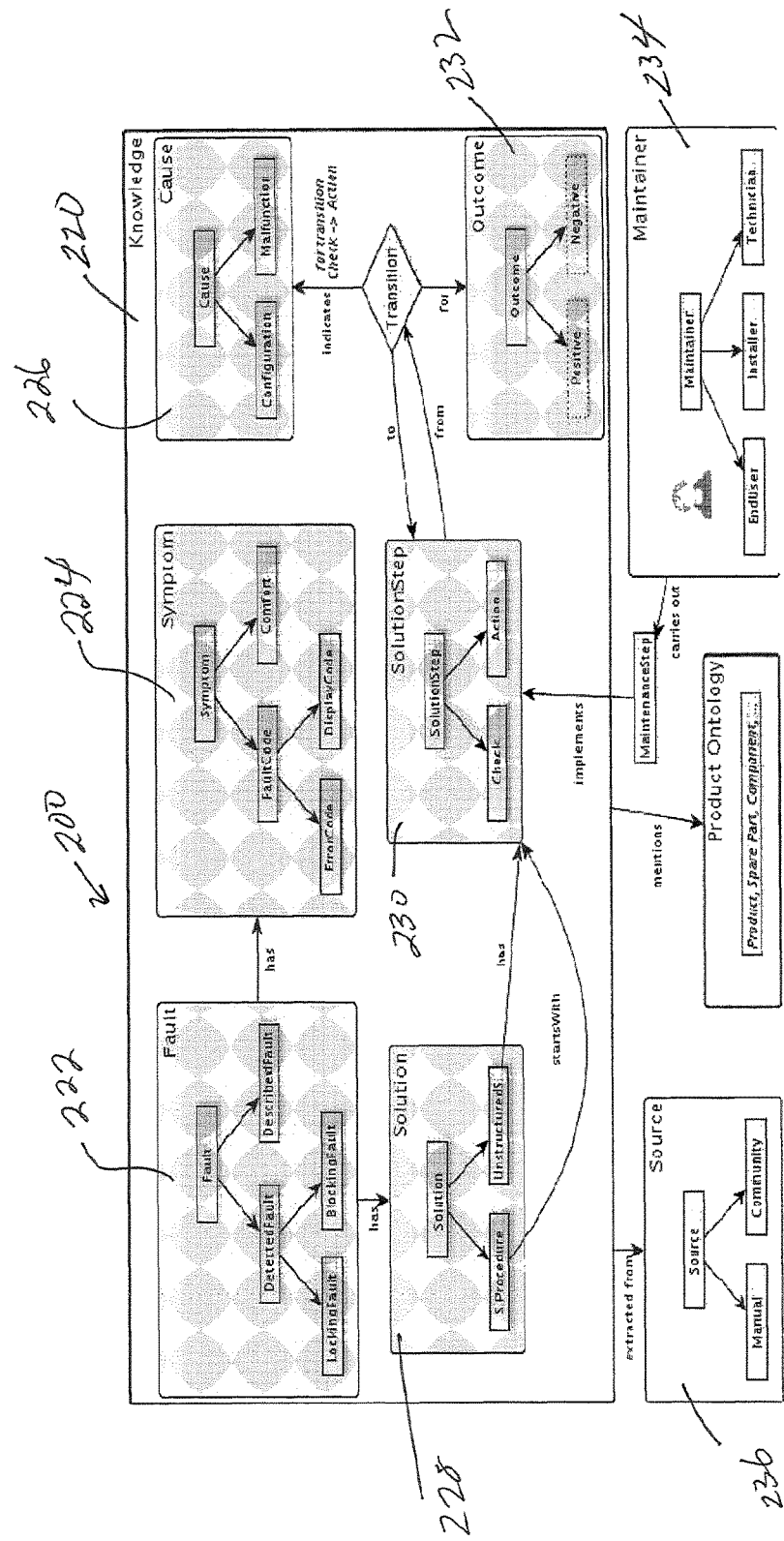
FIG. 10 illustrates a block diagram of an ontology model for use in construction of the diagnostic assistant services component of FIG. 2.

FIG. 10 illustrates one embodiment of the ontology model for diagnostics 200 illustrated in FIG. 2. As illustrated in FIG. 10, the ontology model includes a knowledge component 220 configured to include a fault component 222, a symptom component 224, a cause component 226, a solution component 228 and a solution step component 230. The symptom component 224 is configured to provide an epiphenomenal indication of a fault. The epiphenomenal indication is an indicator of a symptom where more than one indicator indicates the same symptom. The symptom component 224 includes a fault code component which is provided by the device connected to the internet 102 of FIG. 1. A comfort component includes potentially ambiguous observed symptom (e.g., a cold room, a burner making loud noises) which may indicate certain types of faults but which are not always dispositive. The fault code provided by the device includes, in one embodiment, one of two types, an error code and a display code.

The fault component 222 includes a detected fault component recognized by the diagnostic unit of the device and a described fault given as a verbal summary of a symptom description. Detected faults are triggered by a primary symptom and mapped onto a fault code.

The cause component 226 includes component parts of a setting responsible for a determined fault. A configuration cause component 226 determines whether a fault occurs as a result of incorrect programming or improper use of the device. A malfunction cause component is usually associated with a broken component. Causes are detected by checks and connected to symptoms component 224 via a property chain.

The solution step component 230 includes a check component which provides an observation of a setting with the intention to find the cause of a fault. An action component determines the occurrence of a subsequent change of the setting with the intention to eliminate the cause. As soon as a solution step is complete, an instance of maintenance activity to be performed is provided to a user of the system.

The solution component 228 is configured to provide a solution procedure in which solutions are provided in a prescribed sequential manner. An unstructured solution component provides an unordered set of ad-hoc instructions to reach a solution.

An outcome component 232 provides a positive or negative determination of an outcome of the procedures being applied to find a solution.

A maintainer component 234 is configured to enable any one of an end user, an installer, and a technician to find a solution to a symptom related to a device being analyzed. The maintainer component 234 identifies the type of user upon selection by the user through the maintainer component 234. Selection of the type of user indicates to the knowledge component 220 who is carrying out the analysis of the device operations and/or symptoms. The knowledge component 220 configures the type of analysis being performed based on the type of user. For instance, if an end user is making the analysis, the solutions presented are configured to be less technically involved than if the maintainer is the installer.

A source component 236 provides a link to each diagnostic concept instance, which is either linked to sources of information found in manuals, for instance, or a community source of information.

Other embodiments of the ontology model 200 are within the scope of the present disclosure in which the knowledge component 220 is configured to include less than or more than the described components. In addition, the ontology or ontologies used to describe the devices and device status vary according to the device being operated and the anticipated user of the ontology model.

FIG. 11 illustrates a feedback form 1100 wherein the user of the diagnostic service provides can enter actual causes and actions for a given fault. The feedback form 1100 includes a text field 1104 that receives feedback text t information. The feedback form 1100 collects the feedback data to enable the learning and adaptation module 212 to modify the domain knowledge that is stored in association with the ontology model 200. The diagnostic server 210 optionally transmits the feedback data to computing systems that are associated with other service providers and component manufacturers.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following embodiments. The following embodiments are provided as examples and are not intended to be limiting.

Embodiment 1. A mechanism to provide an intelligent diagnostic assistant by integrating different resources which are often isolated from one another. The resources include 1) device profiles, device status, device histories, and/or aggregated information from similar devices from different users, 2) electronic technical manuals and/or 3) user generated contents generated internally within the system and externally, and 4) aggregated and analyzed knowledge of the aforementioned knowledge sources.

Embodiment 2. A mechanism to build a semantic knowledge base and make a semantic knowledge system interactive through an internet.

Embodiment 3. A mechanism to extract useful information from the external knowledge that is browsed by a web crawler or crowd sourcing from forums and/or communities.

Embodiment 4. Semantic models for diagnostics that are applicable to multiple domains.

Embodiment 5. Context-aware remote diagnostics that provide the most relevant information by analyzing the device status, prior actions, and/or current users' skill.

Embodiment 6. Adaptive remote diagnostic services based on users' feedback and actions. FIG. 11 illustrates an example of the User Interface to receive a feedback on a diagnostic/repair service occurrence.

Embodiment 7. A mechanism to learn and adapt diagnostic services based on users' feedbacks and actions by applying new knowledge discovered over time.

Embodiment 8. A mechanism to allow new value added diagnostic services by the recorded actions, replacement of parts, and time to spend on the service. An example of a new value added services is a service that automatically generates bills and allows users to modify the bill if needed.

What is claimed is:

1. A method for providing diagnostic services for a device comprising:
   generating an ontology with a server, the ontology including:
      a diagnostic model having a plurality of diagnostic concepts at least including faults, symptoms, causes, and solutions, and defining relationships between each of the diagnostic concepts; and
      a plurality of diagnostic data relating to a device model corresponding to the device, each diagnostic datum being associated with at least one of the diagnostic concepts;
   storing the ontology in a memory, the memory being accessible by the server;
   receiving a diagnostic query from a user of the device via an input device, the input device being operatively connected to a user interface, the user interface being connected to the server via a network, the receiving further comprising:
      displaying a graphical depiction of a plurality of parts of the device to the user, and
      receiving a selection of a part of the device from the user with reference to the graphical depiction of the plurality of parts;
   identifying at least one diagnostic concept that is associated with the diagnostic query by searching the ontology with the server; and
   outputting the identified at least one diagnostic concept and diagnostic data associated with the identified at least one diagnostic concept to the user.

2. The method of claim 1, the receiving further comprising:
   receiving a semantic query from the user.

3. The method of claim 1, the identification of the at least one diagnostic concept further comprising:
   identifying at least one of a fault, a symptom, and a cause that is associated with the diagnostic query; and
   identifying at least one solution that is related to the identified at least one of the fault, the symptom, and the cause.

4. The method of claim 3, the outputting further comprising:
   outputting diagnostic data associated with the at least one solution to the user, the diagnostic data at least including a procedure for implementing the solution.

5. The method of claim 4, the outputting further comprising:
   displaying a graphical depiction of the device to the user, the graphical depiction highlighting parts referenced by the procedure for implementing the solution.

6. The method of claim 1, the generating further comprising:
   extracting the plurality of diagnostic information from at least one internal source and at least on external source.

7. A system for providing diagnostic services for a device comprising:
   a memory configured to store an ontology, the ontology comprising:
      a diagnostic model having a plurality of diagnostic concepts at least including faults, symptoms, causes, and solutions, and defining relationships between each of the diagnostic concepts; and
      a plurality of diagnostic data relating to a device model corresponding to the device, each diagnostic datum being associated with at least one of the diagnostic concepts; and
   a server operatively connected to the memory, the server being configured to:
      receive a diagnostic query from a user of the device via an input device, the input device being operatively connected to a user interface, the user interface being connected to the server via a network, the server being further configured to:
         display a graphical depiction of a plurality of parts of the device to the user; and
         receive a selection of a part of the device from the user with reference to the graphical depiction of the plurality of parts;
      identify at least one diagnostic concept that is associated with the diagnostic query by searching the ontology with the server; and
      output the identified at least one diagnostic concept and diagnostic data associated with the identified at least one diagnostic concept to the user.

8. The system of claim 7, the server being further configured to receive a semantic query from the user.

9. The system of claim 7, the server being further configured to:
   to identify at least one of a fault, a symptom, and a cause that is associated with the diagnostic query, and
   to identify at least one solution that is related to the identified at least one of the fault, the symptom, and the cause.

10. The system of claim 9, the server being further configured to output diagnostic data associated with the at least one solution to the user, the diagnostic data at least including a procedure for implementing the solution.

11. The system of claim 10, the server being further configured to display a graphical depiction of the device to the user, the graphical depiction highlighting parts referenced by the procedure for implementing the solution.

12. The system of claim 7, the server being further configured to extract the plurality of diagnostic information from at least one internal source and at least on external source.

* * * * *